(12) United States Patent
Lee

(10) Patent No.: US 12,541,372 B2
(45) Date of Patent: Feb. 3, 2026

(54) PARALLEL PROCESSING DEVICE AND OPERATING METHOD THEREOF

(71) Applicant: Electronics and Telecommunications Research Institute, Daejeon (KR)

(72) Inventor: Joo Hyun Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 222 days.

(21) Appl. No.: 18/361,561

(22) Filed: Jul. 28, 2023

(65) Prior Publication Data

US 2024/0202004 A1 Jun. 20, 2024

(30) Foreign Application Priority Data

Dec. 14, 2022 (KR) .................. 10-2022-0175284
Mar. 3, 2023 (KR) .................. 10-2023-0028398

(51) Int. Cl.
G06F 8/41 (2018.01)
G06F 9/38 (2018.01)
G06F 11/34 (2006.01)

(52) U.S. Cl.
CPC .................. G06F 9/3885 (2013.01)

(58) Field of Classification Search
None
See application file for complete search history.

(56) References Cited

U.S. PATENT DOCUMENTS

| | | | |
|---|---|---|---|
| 2009/0013151 A1 | 1/2009 | Hara | |
| 2011/0285729 A1* | 11/2011 | Munshi | ............ G06T 1/60 345/536 |
| 2012/0081396 A1* | 4/2012 | Yusupov | ............ G06F 9/544 345/635 |
| 2013/0198758 A1 | 8/2013 | Lim et al. | |
| 2015/0106819 A1 | 4/2015 | Kim et al. | |

(Continued)

FOREIGN PATENT DOCUMENTS

| | | |
|---|---|---|
| JP | 2002-007359 | 1/2002 |
| JP | 2009-015556 | 1/2009 |

(Continued)

OTHER PUBLICATIONS

Tine Blaise et al, 'Bringing OpenCL to Commodity RISC-V CPUs', Fifth Workshop on Computer Architecture Research with RISC-V (Jun. 17, 2021).

*Primary Examiner* — Hyun Nam
(74) *Attorney, Agent, or Firm* — KILE PARK REED & HOUTTEMAN PLLC

(57) ABSTRACT

Provided is a parallel processing device with one or more group processors, in which each of the one or more group processors includes a plurality of instance processors configured to process a kernel execution instance for a predetermined parallel program model-based kernel, each of the plurality of instance processors includes a register storing context reference information including an identifier of a group processor to which the instance processor belongs and an identifier of the instance processor, and each of the plurality of instance processors executes the kernel by reading execution context data, which is stored in a memory for execution of the kernel, using the context reference instance.

10 Claims, 5 Drawing Sheets

(56) References Cited

U.S. PATENT DOCUMENTS

| | | | |
|---|---|---|---|
| 2016/0378471 A1 | 12/2016 | Lerzer et al. | |
| 2018/0131575 A1* | 5/2018 | He | H04B 7/0413 |
| 2019/0205741 A1* | 7/2019 | Gupta | G06N 3/0464 |
| 2020/0250005 A1* | 8/2020 | Munshi | G06F 9/4843 |
| 2024/0202004 A1* | 6/2024 | Lee | G06F 9/3885 |

FOREIGN PATENT DOCUMENTS

| | | |
|---|---|---|
| KR | 10-0613923 | 8/2006 |
| KR | 10-2017-0096103 | 8/2017 |
| KR | 10-2022-0128903 | 9/2022 |
| KR | 10-2466984 | 11/2022 |

* cited by examiner

FIG. 3

```
struct context_workgroup_t
{
    uint64_t local_work_id[3];
    uint64_t local_work_size[3];
    uint64_t local_base_ptr;
    uint64_t global_work_offset[3];
    uint64_t global_work_size[3];
    uint64_t num_work_groups[3];
    uint64_t global_work_dim;
    uint64_t kernel_arg_base_ptr;
    uint64_t kernel_arg_byte_size;
};
struct context_workitem_t
{
    uint64_t local_id[3];
    uint64_t global_id[3];
    uint64_t private_base_ptr;
    uint64_t private_stack_ptr;
};
```

PARALLEL PROCESSING DEVICE AND OPERATING METHOD THEREOF

CROSS-REFERENCE TO RELATED APPLICATION

This application claims priority to and the benefit of Korean Patent Application Nos. 10-2022-0175284 and 10-2023-0028398, filed on Dec. 14, 2022 and Mar. 3, 2023, respectively, the disclosure of which is incorporated herein by reference in its entirety.

BACKGROUND

1. Field of the Invention

The present disclosure relates to a parallel processing device and an operating method thereof, and more specifically, to a parallel processing device for performing open computing language (OpenCL)-based parallel processing and an operating method thereof.

2. Discussion of Related Art

Recently, in the fields of artificial intelligence and high-performance computing (HPC), attempts have been made to improve performance using a parallel processing computing unit (parallel processing device) such as a graphics processing unit (GPU).

FIG. 1 schematically illustrates an example of a structure of a commercial GPU. In the commercial GPU of FIG. 1, processors named single-instruction-multiple-thread (SIMT) cores are used as parallel processor cores and are configured to execute OpenCL or computed unified device architecture (CUDA) programming model-based programs in parallel. The plurality of SIMT cores form a SIMT core cluster.

Popular commercial parallel processing devices, such as the GPU of FIG. 1, are compatible with open general-purpose parallel programming models such as an OpenCL model, and the OpenCL model can be used for the development of new technologies because the standards, application program interface (API), and the like thereof are open to the public. However, parallel processor core technology for executing programs has not been open to the public, thus hindering the development of new technologies.

The background art of the present disclosure is disclosed in Korean Laid-open Patent Publication No. 10-2017-0096103 (published on Aug. 23, 2017).

SUMMARY OF THE INVENTION

In order to develop an OpenCL model-based parallel processing device, it is necessary to secure a processor core technology corresponding to the conventional single-instruction-multiple-thread (SIMT) core. The present disclosure provides a structure of execution context data necessary to use a reduced instruction set computer-five (RISC-V) core as a processor core of a parallel processing device, a transmission method thereof, and a method of executing a kernel on the basis of the structure of the execution context data.

An aspect of the present disclosure provides a parallel processing device with one or more group processors, in which each of the one or more group processors includes a plurality of instance processors configured to process a kernel execution instance for a predetermined parallel program model-based kernel, each of the plurality of instance processors includes a register storing context reference information including an identifier of a group processor to which the instance processor belongs and an identifier of the instance processor, and each of the plurality of instance processors executes the kernel by reading execution context data, which is stored in a memory for execution of the kernel, using the context reference instance.

In an embodiment of the present disclosure, a plurality of sets of kernel execution instances may be defined as a kernel execution group, and the execution context data may include first data for compatibility between the instance processor and the parallel program model, and second data for transmission of parameters necessary to execute the kernel.

In an embodiment of the present disclosure, the execution context data may include group context data and instance context data that are obtained by structuralizing the first data and the second data for the kernel execution group and the kernel execution instance.

In an embodiment of the present disclosure, one piece of group context data may be generated for a certain group processor, a plurality of pieces of instance context data may be generated as many as the number of instance processors included in the group processor, and the one piece of group context data and the plurality of pieces of instance context data may form an execution context data subset.

In an embodiment of the present disclosure, a plurality of execution context data subsets may be generated as many as the number of group processors.

In an embodiment of the present disclosure, based on the group processor, the group context data may be data shared by all the instance processors included in the group processor, and the instance context data may be data independently used by the instance processors.

In an embodiment of the present disclosure, in the register, an address area for allocating an address value of the memory may be defined, and a first address value of a command for executing the kernel stored in the memory and a second address value of the execution context data stored in the memory may be stored in an address area of the register.

In an embodiment of the present disclosure, based on a certain instance processor, the instance processor may read a command for executing the kernel using the first address value to trigger the execution of the kernel, identify a location of the execution context data stored in the memory using the second address value, read group context data and instance context data corresponding to the instance processor using the context reference information, and execute the kernel.

In an embodiment of the present disclosure, the parallel program model may be an open computing language (OpenCL) framework, and the instance processor may be a reduced instruction set computer-five (RISC-V) core.

An another aspect of the present disclosure provides an operating method of a parallel processing device with one or more group processors each including a plurality of instance processors for processing a kernel execution instance for a predetermined parallel program model-based kernel, in which each of the plurality of instance processors includes a register storing context reference information including an identifier of a group processor to which the instance processor belongs and an identifier of the instance processor, the operating method including: triggering, by each of the instance processors, execution of the kernel by reading a kernel execution instance stored in a memory, reading, by each of the instance processors, execution context data, which is stored in the memory for execution of the kernel, using the context reference information, and executing, by each of the instance processors, the kernel using the read execution context data.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 illustrates a structure of execution context data in a parallel processing device according to an embodiment of the present disclosure;

DETAILED DESCRIPTION OF EXEMPLARY EMBODIMENTS

Figure 1:
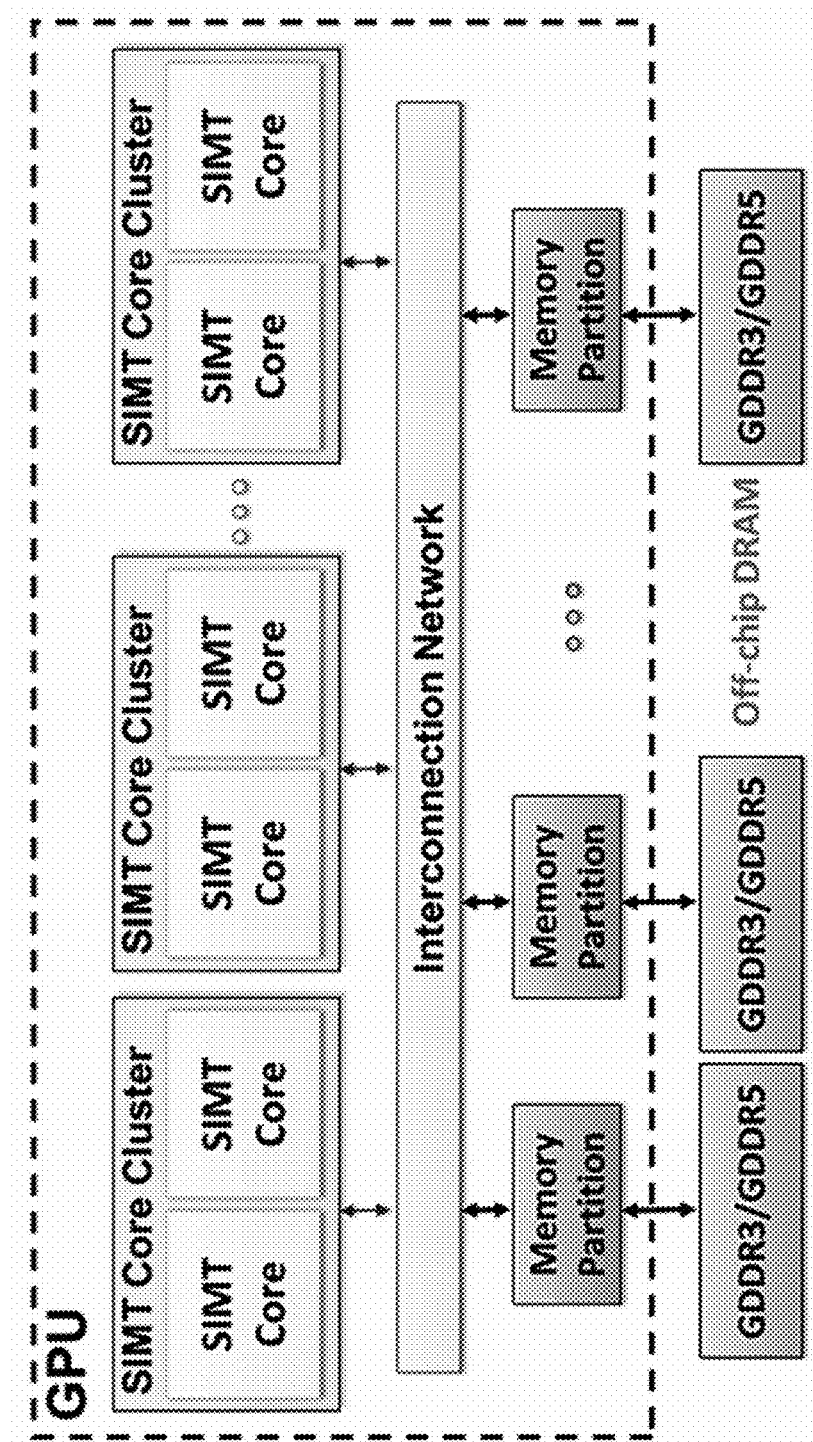
FIG. 1 is a diagram illustrating an example of a structure of a commercial graphics processing unit (GPU) of the related art.

Hereinafter, a parallel processing device and an operating method thereof according to embodiments of the present disclosure will be described with reference to the accompanying drawings. The thickness of each line, the size of each component, etc. shown in the drawings may be exaggerated for clarity and convenience of description. Terms to be described below should be defined in consideration of functions of the present disclosure but may vary depending on the intention of users or operators, practices, or the like. Therefore, the terms should be defined based on the whole context of the present disclosure.

Figure 2:
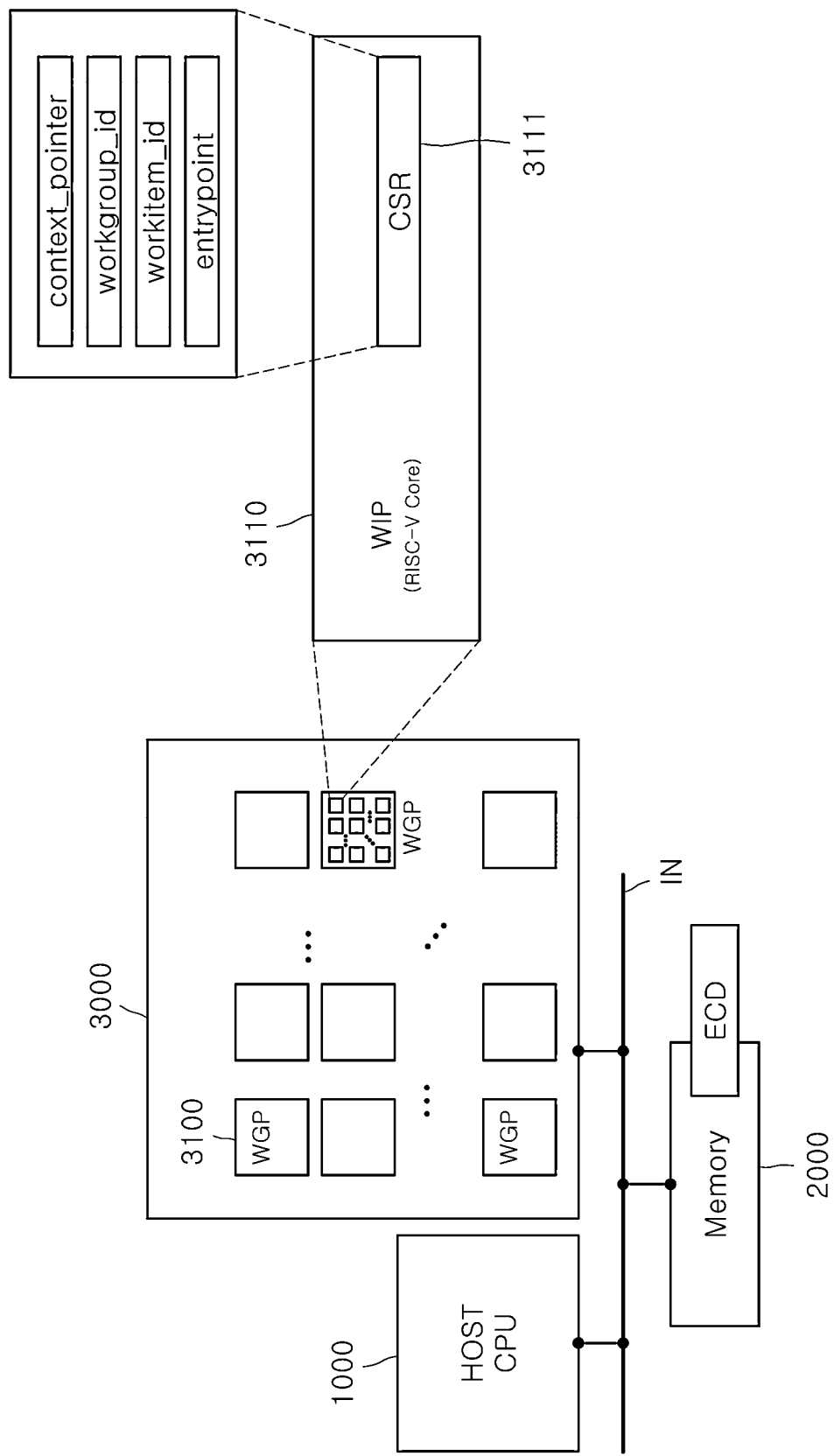
FIG. 2 is a block diagram for describing a parallel processing device according to an embodiment of the present disclosure.
Figure 4:
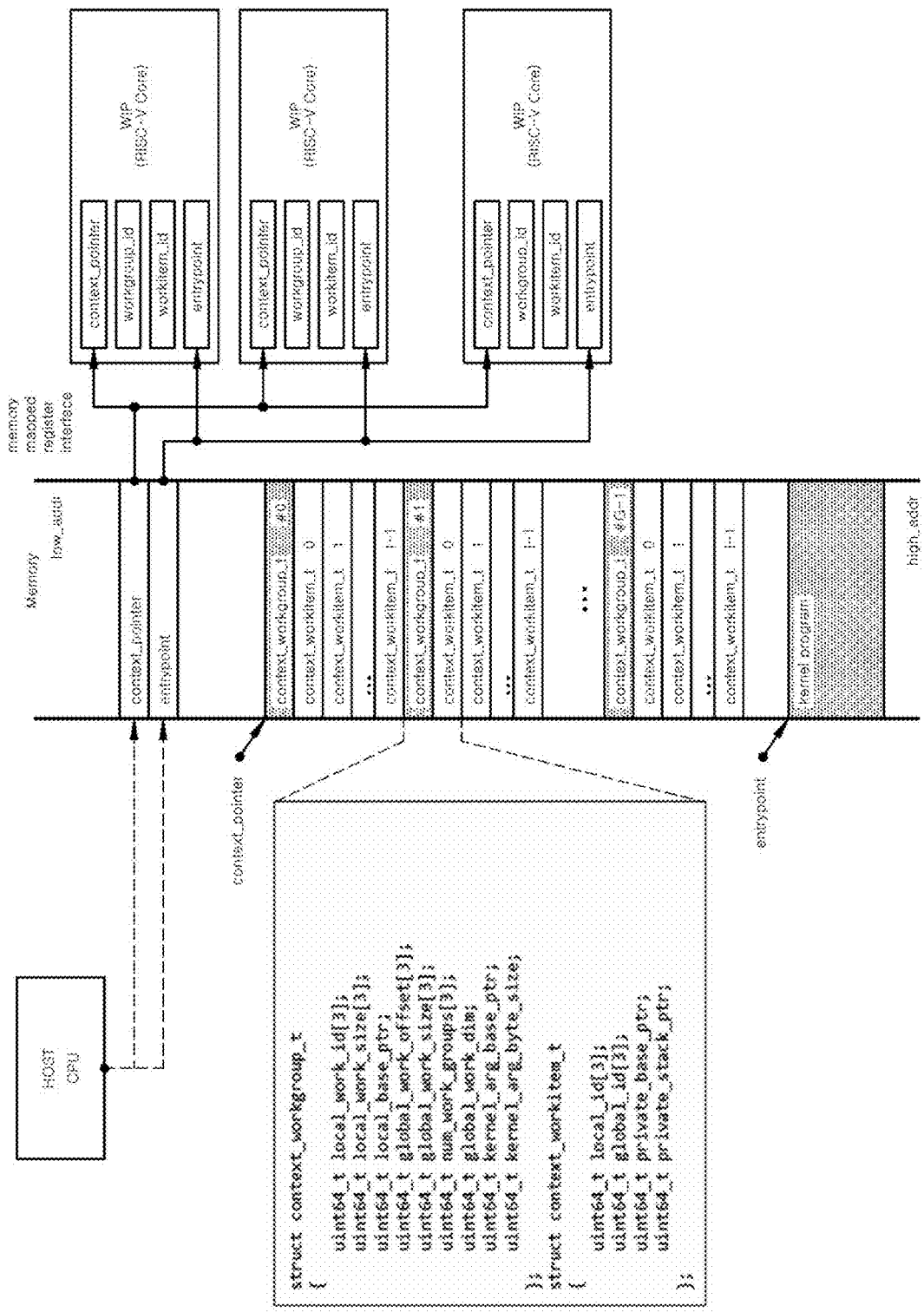
FIG. 4 illustrates a process of executing a kernel in a parallel processing device according to an embodiment of the present disclosure.

FIG. 2 is a block diagram for describing a parallel processing device according to an embodiment of the present disclosure. FIG. 3 is a diagram illustrating an example of a structure of execution context data in a parallel processing device according to an embodiment of the present disclosure. FIG. 4 is a diagram of a process of executing a kernel in a parallel processing device according to an embodiment of the present disclosure.

Referring to FIG. 2, a parallel processing device 3000 of the present embodiment includes one or more group processors 3100, each of the group processors 3100 includes a plurality of instance processors 3110, and each of the instance processors 3110 includes a register 3111. The parallel processing device 3000 may be implemented as a computing device such as a central processing unit (CPU), a GPU, a coprocessor or a field programmable gate array (FPGA). The parallel processing device 3000 may be connected to a host processor 1000 and a memory 2000 through an interconnection network (IN). The memory 2000 may be embodied as a read-only memory (ROM), a random access memory (RAM), an erasable programmable ROM (EPROM), an electrically erasable programmable ROM (EEPROM), a flash memory, or the like.

The host processor 1000, the memory 2000, and the parallel processing device 3000 constitute a parallel processing platform. As will be described below, the host processor 1000 compiles a kernel or program to be executed by the instance processors 3110, stores a compiled result in the memory 2000, generates execution context data (ECD) for execution of the kernel, and stores the ECD in the memory 2000. Thereafter, each of the instance processors 3110 constituting the group processor 3100 reads the ECD stored in the memory 2000 to execute the kernel, based on context reference information stored in the register 3111.

As described above, the present embodiment is focused on a configuration employing the parallel processing device 3000 based on the OpenCL model, and reduced instruction set computer-five (RISC-V) cores as processor cores constituting the parallel processing device 3000, and a structure of execution context data required in this case, a transmission method thereof, and a method of executing a kernel based on the execution context data are provided. Accordingly, first, the terms employed in the claims of the present application will be defined in terms of the OpenCL model and the RISC-V core.

A kernel execution instance is a work-item of OpenCL, and the instance processor 3110 is a work-item processor (WIP) process for processing the work-item. When a kernel execution command is received from the host processor 1000, the WIP triggers the execution of the kernel, and an index space of an N-dimensional space named N-Dimension Range (RDRange) is determined during the triggering of the execution of the kernel (N=3 in the present embodiment). Thus, each point in the RDRange corresponds to a work-item, and one work-item is executed by being assigned to one WIP.

A kernel execution group includes a plurality of sets of kernel execution instances and should be understood as a work-group including a plurality of sets of work-items in terms of OpenCL. Accordingly, the group processor 3100 is a work group processor (WGP) including a plurality of WIPs.

In the present embodiment, the WIP is implemented as a RISC-V core. The WIP implemented as the RISC-V core supports a 12-bit control status register (CSR) address space area in which 4096 registers are connectable. The register 3111 described in the claims of the present application corresponds to a CSR in terms of an RISC-V core. The CSR includes some reserved areas, and in the present embodiment, context reference information and first and second address values are assigned to and stored in a reserved area that remains unused.

Based on the above description, the parallel processing device 3000 of the present embodiment will be described in detail, and in order to help the understanding of the present embodiment, a kernel execution instance, a kernel execution group, an instance processor, a group processor, and a register will be respectively described as a work-item, a work group, a WIP, a WGP, and a CSR in terms of OpenCL and the RISC-V core.

1. WIP and CSR

A WIP processes a work-item for an OpenCL model-based kernel. As described above, there are some reserved areas in a CSR included in the WIP, and an identifier (ID) workgroup_id of a WGP to which the WIP belongs, an ID workitem_id of the WIP (workgroup_id and workitem_id are defined as context reference information), an address value entrypoint of a command for executing a kernel stored in the memory 2000, and an address value context_pointer of execution context data stored in the memory 2000 are stored in the reserved areas. Table 1 below shows information stored in the reserved area of the CSR.

TABLE 1

| Name | Description |
| --- | --- |
| workgroup_id | ID of a WGP to which a WIP belongs (workgroup_id is 0, 1, 2, . . . , or G − 1 when the total number of WGPs is G)<br>A fixed read-only value determined during the design of hardware |
| workitem_id | ID of each WIP in one WGP (workitem_id is 0, 1, 2, . . . , or I − 1 when the total number of WIPs in the WGP is I)<br>A fixed read-only value determined during the design of hardware |
| entrypoint | An address value of a stored first command for a program (kernel) to be executed by each WIP |
| context_pointer | An address value indicating the location of execution context data containing values such as parameters for execution of the kernel, a structure of a stack, and an OpenCL parameter |

The WIP performs read and write operations on the CSR in response to CSRW and CSRR commands, which are RISC-V commands and executes the kernel by reading execution context data stored in the memory 2000 according to a result of performing the read and write operations, based on the context reference information (workgroup_id and workitem_id).

2. Execution Context Data

To execute an OpenCL model-based kernel, the structure of execution context data needed to execute the kernel should be defined. To this end, in the present embodiment, the execution context data includes first data for compatibility between a WIP and an OpenCL model, second data for the transmission of a parameter required to execute the kernel, and third data for the configuration of a private memory for the execution of the kernel by the WIP. In addition, the execution context data has an architecture in which the first data and the second data are structuralized in units of work groups and work items. Data obtained by structuralizing the first data and the second data in units of work groups will be defined as group context data, and data obtained by structuralizing the first data to the third data in units of work items will be defined as instance context data. Table 2 below shows the details of the first data to the third data, and the architecture in which the group context data and the instance context data are structured. FIG. 3 illustrates the structure of execution context data.

TABLE 2

| Structuralized data | Data type | Name | Description |
| --- | --- | --- | --- |
| Group context data (context_workgroup_t) | First data | uint64_t local_work_id[3] | IDs of workgroups (that are 3-dimensions, and denoted by x, y, and z, respectively) handled currently by a WGP in the entire NDRange |
| | First data | uint64_t local_work_size[3] | A size of workgroups (total number of workitems) currently handled by the WGP in the entire NDRange |
| | First data | uint64_t local_base_ptr | A base pointer (address value) of a local memory used commonly by all WIPs included in the WGP |
| | First data | uint64_t global_work_offset[3] | Offset locations in entire NDRange data of data currently being processed in the WGP |
| | First data | uint64_t global_work_size[3] | Total NDRange data size of data currently being processed in the WGP |
| | First data | uint64_t num_work_groups[3] | Total number of work groups included in NDRange |
| | First data | uint64_t global_work_dim | Dimension of NDRange with a value of {1, 2, 3} |
| | Second data | uint64_t kernel_arg_base_ptr | A base address of a memory storing arguments of a main kernel function that is a first execution function of the WIP |
| | Second data | uint64_t kernel_arg_byte_size | The byte size of a memory storing the arguments of the main kernel function that is the first execution function of the WIP |
| Instance context data (context_workitem_t) | First data | uint64_t local_id[3] | ID values in a workgroup of work items processed by the WIP |
| | First data | uint64_t global_id[3] | ID values in an NDRange of work items processed by the WIP |
| | Third data | uint64_t private_base_ptr | Base pointer of private memory used by WIP |
| | Second data | uint64_t private_stack_ptr | Stack pointer for stack memory used by WIP |

In the execution context data shown in Table 2 and FIG. 3, data included in group context data context_workgroup_t is data shared by all WIPs included in the WGP, and data included in instance context data context_workitem_t is data used independently by each WIP.

3. Transmission of Execution Context Data and Execution of Kernel

FIG. 4 illustrates a process of executing a kernel by the parallel processing device 3000.

First, the host processor 1000 compiles a kernel to be executed by WIPs, stores a compiled result in the memory 2000, and stores an address value entrypoint (defined as a first address value) of a first command for executing the kernel in the memory 2000.

Next, the host processor 1000 generates execution context data necessary for the WIP to execute the kernel and stores the execution context data in the memory 2000. In this case, based on a specific WGP, one piece of group context data context_workgroup_t is generated for a specific WGP, and a plurality of pieces of instance context data context_workitem_t are generated as many as the number of WIPs included in the specific WGP. The one piece of group context data and the plurality of pieces of instance context data generated as described above form an execution context data subset, and a plurality of execution context data subsets are generated as many as the number of WGPs included in the parallel processing device 3000. Accordingly, as shown in FIG. 4, the entire execution context data consists of a plurality of execution context data subsets generated as many as the number of WGPs, and the execution context data subsets are continuously allocated to and stored in the memory 2000. The host processor 1000 stores a first start address value context_pointer (defined as a second address value) of the execution context data, which is stored in the memory 2000, in the memory 2000. The first address value entrypoint and the second address value context_pointer stored in the memory 2000 are transmitted to and stored in address areas, i.e., entrypoint and context_pointer shown in Table 1, in the WIP through a memory-mapped register interface.

Thereafter, the WIP reads a command for executing a kernel using the entrypoint of the CSR, i.e., the first address value and triggers the execution of the kernel. A parameter of the kernel and an OpenCL parameter are required to execute the kernel, and the WIP identifies a location of execution context data stored in the memory 2000 using context_pointer of the CSR, i.e., the second address value. Thereafter, the WIP reads group context data context_workgroup_t and instance context data context_workitem_t corresponding thereto using context reference information of the CSR (i.e., workgroup_id and workitem_id shown in Table 1), byte_size data of group context data context_workgroup_t, and the like. The parameter of the kernel and the OpenCl parameter are secured by reading the group context data context_workgroup_t and the instance context data context_workitem_t, and the WIP executes the kernel using the parameter of the kernel and the OpenCl parameter. The above processes are performed in parallel by each WIP.

Figure 5:
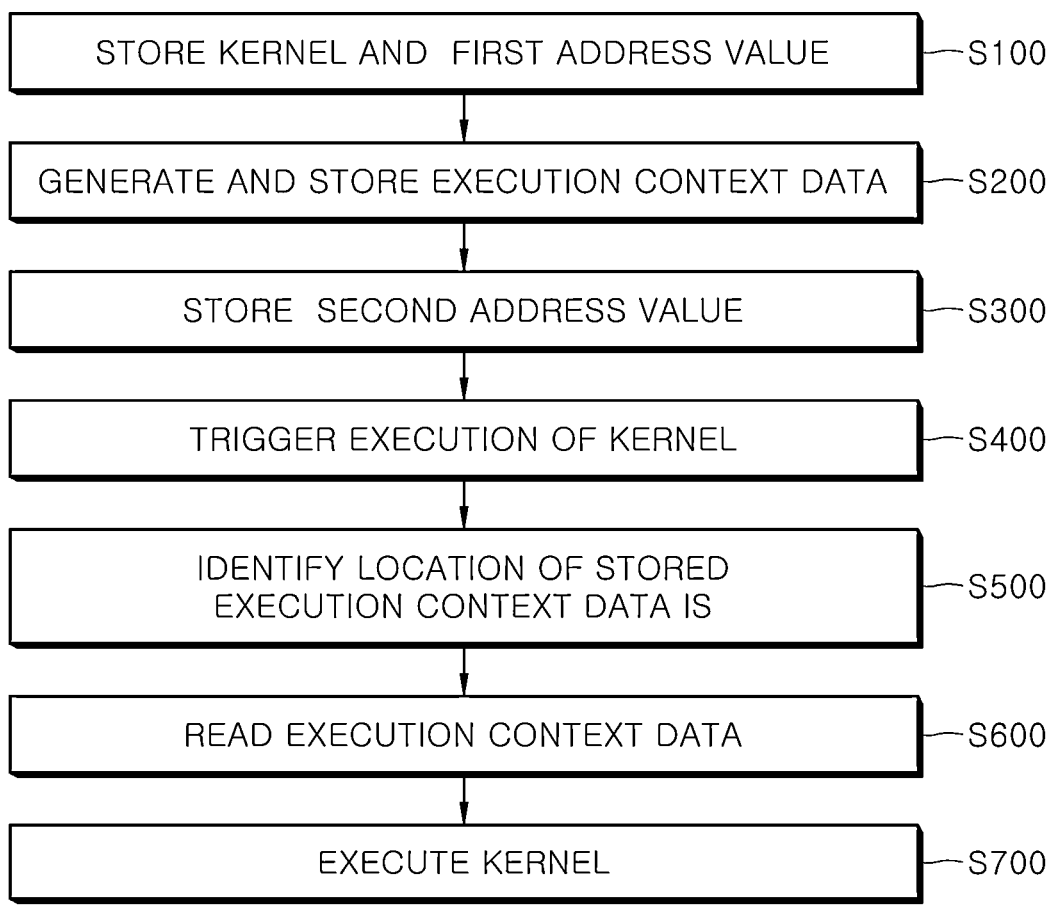
FIG. 5 is a flowchart of an operating method of a parallel processing device according to an embodiment of the present disclosure.

FIG. 5 is a flowchart of an operating method of a parallel processing device according to an embodiment of the present disclosure. The operating method of the parallel processing device of the present embodiment will be described with reference to FIG. 5, a detailed description of parts thereof overlapping the above description will be omitted, and the operating method will be described in a time series manner.

First, the host processor 1000 compiles a kernel to be executed by WIPs, stores a compiled result in the memory 2000, and stores a first address value of a first command for executing the kernel in the memory 2000 (S100).

Next, the host processor 1000 generates execution context data necessary to execute the kernels and stores the execution context data in the memory 2000 (S200). The execution context data includes first data for compatibility between a WIP and an OpenCL model, second data for the transmission of a parameter required to execute the kernel, and third data for the configuration of a private memory for the execution of the kernel by the WIP. In addition, the execution context data includes group context data and instance context data in which the first data and second data are structuralized in units of work groups and work items. In operation S200, the host processor 1000 generates one piece of group context data for a specific WGP on the basis of the specific WGP and generates a plurality of pieces of instance context data as many as the number of WIPs included in the specific WGP. The one piece of group context data and the plurality of pieces of instance context data form an execution context data subset, and the host processor 1000 generates execution context data subsets as many as the number of WGPs to form entire execution context data.

Next, the host processor 1000 stores a first starting address value, i.e., a second address value, of the execution context data stored in the memory 2000 in the memory 2000 (S300). The first and second address values stored in the memory 2000 are transmitted to and stored in an address area of a CSR inside the WIP through a memory-mapped register interface.

Next, the WIP reads a kernel execution command using the first address value stored in the CSR to trigger the execution of the kernel (S400).

Next, the WIP identifies a location of the execution context data stored in the memory 2000 using the second address value stored in the CSR (S500).

Next, the WIP reads group context data and instance context data corresponding thereto using context reference information stored in the CSR, i.e., an identifier of a WGP to which the WIP belongs and an identifier of the WIP (S600).

Thereafter, the WIP executes the kernel using the execution context data read in operation S600 (S700).

As described above, according to the present embodiment, in an OpenCL model-based parallel processing device, a method of using an RISC-V core as a processor core of the parallel processing device may be proposed.

The embodiments described herein may be implemented, for example, as a method or process, a device, a software program, a data stream, or a signal. Even when the present disclosure is described only in the context of a single embodiment (e.g., a method), the features of the embodiment can be implemented in different forms (e.g., a device or program). The device may be implemented as appropriate hardware, software, firmware, or the like. The method may be implemented by a device such as a processor that generally refers to processing devices, including a computer, a microprocessor, an integrated circuit, or a programmable logic device. Examples of the processor include communication devices, such as a computer, a cellular phone, a portable/personal digital assistant (PDA), and other types of devices, which facilitate the communication of information between end-users.

The present disclosure has been described above with reference to the embodiments illustrated in the drawings but the embodiments are only examples and it will be apparent to those of ordinary skill in the art that various modifications may be made and other equivalent embodiments are derivable from the embodiments. Therefore, the technical scope of the present disclosure should be defined by the appended claims.

What is claimed is:

1. A parallel processing device comprising one or more group processors, wherein:
each of the one or more group processors comprises a plurality of instance processors configured to process a kernel execution instance for a predetermined parallel program model-based kernel;
each of the plurality of instance processors comprises a register storing context reference information including an identifier of a group processor to which the instance processor belongs and an identifier of the instance processor; and
each of the plurality of instance processors executes the kernel by reading execution context data, which is stored in a memory for execution of the kernel, using a context reference instance,
wherein the execution context data comprises first data for compatibility between the instance processor and the parallel program model and second data for transmission of parameters necessary to execute the kernel.

2. The parallel processing device of claim 1, wherein a plurality of sets of kernel execution instances are defined as a kernel execution group.

3. The parallel processing device of claim 2, wherein the execution context data comprises group context data and instance context data that are obtained by structuralizing the first data and the second data for the kernel execution group and the kernel execution instance.

4. The parallel processing device of claim 3, wherein, one piece of group context data is generated for a certain group processor, a plurality of pieces of instance context data are generated as many as the number of instance processors included in the group processor, and
the one piece of group context data and the plurality of pieces of instance context data form an execution context data subset.

5. The parallel processing device of claim 4, wherein a plurality of execution context data subsets are generated as many as the number of group processors.

6. The parallel processing device of claim 4, wherein, based on the group processor, the group context data is data shared by all the instance processors included in the group processor, and the instance context data is data independently used by the instance processors.

7. The parallel processing device of claim 4, wherein, in the register, an address area for allocating an address value of the memory is defined, and
a first address value of a command for executing the kernel stored in the memory and a second address value of the execution context data stored in the memory are stored in an address area of the register.

8. The parallel processing device of claim 7, wherein, based on a certain instance processor, the instance processor reads a command for executing the kernel using the first address value to trigger the execution of the kernel, identifies a location of the execution context data stored in the memory using the second address value, reads group context data and instance context data corresponding to the instance processor using the context reference information, and executes the kernel.

9. The parallel processing device of claim 1, wherein the parallel program model comprises an open computing language (OpenCL) framework, and the instance processor comprises a reduced instruction set computer-five (RISC-V) core.

10. An operating method of a parallel processing device including one or more group processors, each of which includes a plurality of instance processors for processing a kernel execution instance for a predetermined parallel program model-based kernel in which each of the plurality of instance processors includes a register storing context reference information including an identifier of a group processor to which the instance processor belongs and an identifier of the instance processor, the operating method comprising:
triggering, by each of the instance processors, execution of the kernel by reading a kernel execution instance stored in a memory;
reading, by each of the instance processors, execution context data, which is stored in the memory for execution of the kernel, using the context reference information; and
executing, by each of the instance processors, the kernel using the execution context data that has been read,
wherein the execution context data comprises first data for compatibility between the instance processor and the parallel program model and second data for transmission of parameters necessary to execute the kernel.

* * * * *